United States Patent
Lin

(10) Patent No.: US 8,366,326 B2
(45) Date of Patent: Feb. 5, 2013

(54) OPTICAL FIBER CONNECTOR

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 261 days.

(21) Appl. No.: 12/981,506

(22) Filed: Dec. 30, 2010

(65) Prior Publication Data
US 2012/0076458 A1    Mar. 29, 2012

(30) Foreign Application Priority Data
Sep. 27, 2010 (TW) .............................. 99132596 A

(51) Int. Cl.
*G02B 6/36* (2006.01)

(52) U.S. Cl. ............... 385/78; 385/76; 385/77; 385/88; 385/89; 385/92; 385/93

(58) Field of Classification Search ............... 385/78, 385/93
See application file for complete search history.

(56) References Cited

U.S. PATENT DOCUMENTS

| | | | |
|---|---|---|---|
| 5,259,052 A * | 11/1993 | Briggs et al. | 385/78 |
| 7,896,559 B2 * | 3/2011 | Yi et al. | 385/75 |
| 8,251,593 B2 * | 8/2012 | Liao et al. | 385/90 |
| 8,262,296 B2 * | 9/2012 | Liao et al. | 385/90 |
| 2011/0085766 A1 * | 4/2011 | Liao et al. | 385/71 |
| 2011/0091162 A1 * | 4/2011 | He et al. | 385/75 |
| 2011/0097043 A1 * | 4/2011 | He et al. | 385/75 |
| 2012/0008902 A1 * | 1/2012 | Wu | 385/77 |

* cited by examiner

*Primary Examiner* — Ryan Lepisto
(74) *Attorney, Agent, or Firm* — Altis Law Group, Inc.

(57) ABSTRACT

An optical fiber connector includes a connector hold, an optical fiber connector body, an elastic member, and a number of optical fibers. The connector hold defines a receiving recess and a position slot in communication with the receiving recess. The optical fiber connector body is engaged in the receiving recess of the connector hold. The optical fiber connector body includes a positioning post corresponding to and received in the position slot. The optical fibers pass through the connector hold and are attached to the optical fiber connector body. The connector hold includes a slide block received in the position slot, one end surface of the slide block contacts the elastic member, and the other end of the slide block is engaged with a distal end of the positioning post. The slide block is sized and shaped conforming to the position slot.

14 Claims, 3 Drawing Sheets

OPTICAL FIBER CONNECTOR

BACKGROUND

1. Technical Field

The present disclosure relates to connectors, and particularly, to an optical fiber connector.

2. Description of Related Art

An optical fiber connector couples optical fibers. The optical fiber connector typically includes a holding portion and an optical fiber connector body retained therein. One end of the optical fiber connector body is connected to a number of optical fibers; the other end of the optical fiber connector body has a number of lenses positioned thereon, each aligned with a corresponding optical fiber. When in use, two optical fiber connectors are connected to communicate the optical signals between two optical fibers using the lenses. The connector bodies of the connectors are in contact with each other, and the optical signals can be transmitted from one optical fiber to another. The optical fiber connector further includes a resilient member (typically, a helical spring) employed to enhance contact and stabilize the optical fiber connector body.

One end of the helical spring adjoins the inner surface of the holding portion while the other end adjoins an end of the optical fiber connector body connecting to the optical fiber. However, when two optical fiber connectors are connected, if the force acting on the optical fiber connectors is asymmetrical, the optical fiber connector body may be misaligned with the corresponding holding portion.

What is needed therefore is an optical fiber connector addressing the limitations described.

BRIEF DESCRIPTION OF THE DRAWINGS

The components of the drawings are not necessarily drawn to scale, the emphasis instead being placed upon clearly illustrating the principles of the embodiments of the optical fiber connector. Moreover, in the drawings, like reference numerals designate corresponding parts throughout several views.

DETAILED DESCRIPTION

Figure 1:
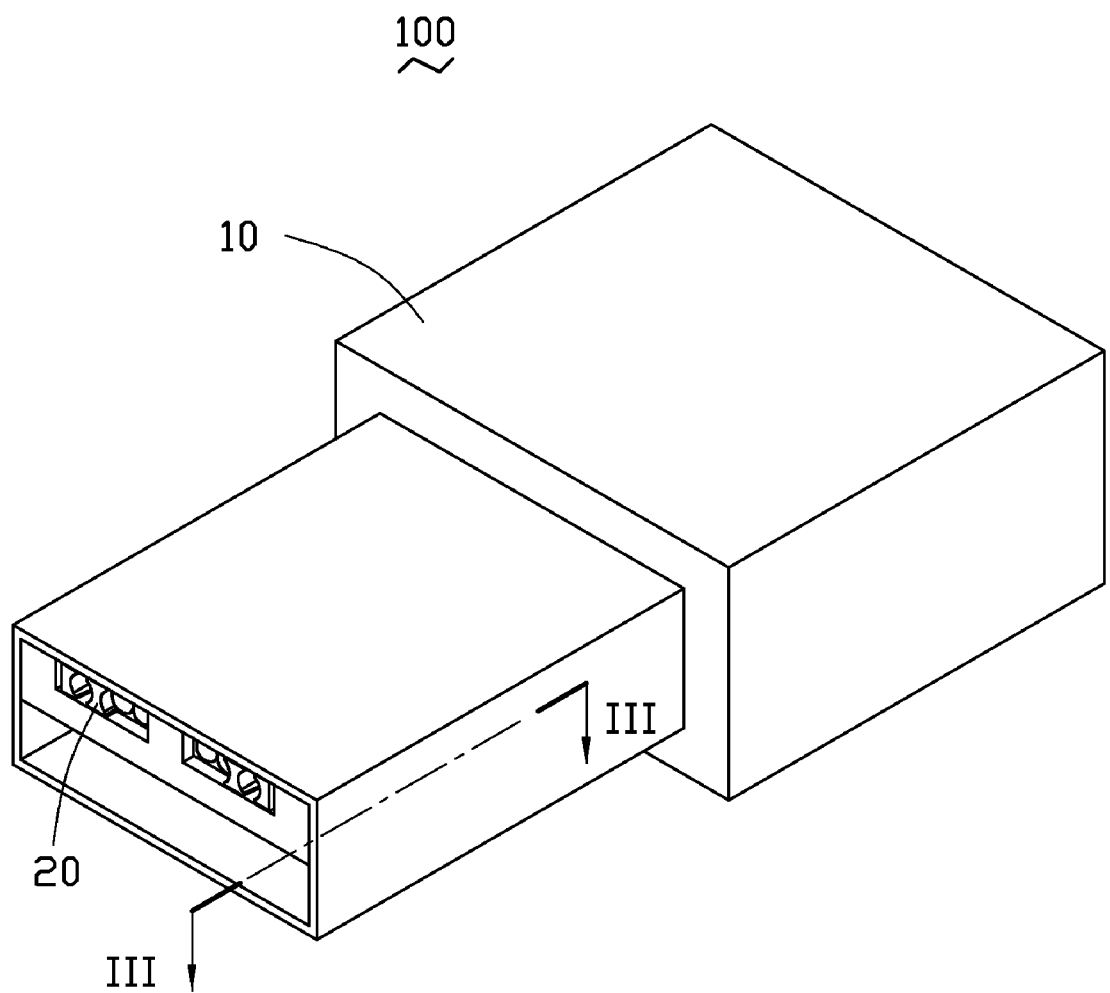
FIG. 1 is an isometric view of an optical fiber connector, according to an exemplary embodiment of the present disclosure.
Figure 2:
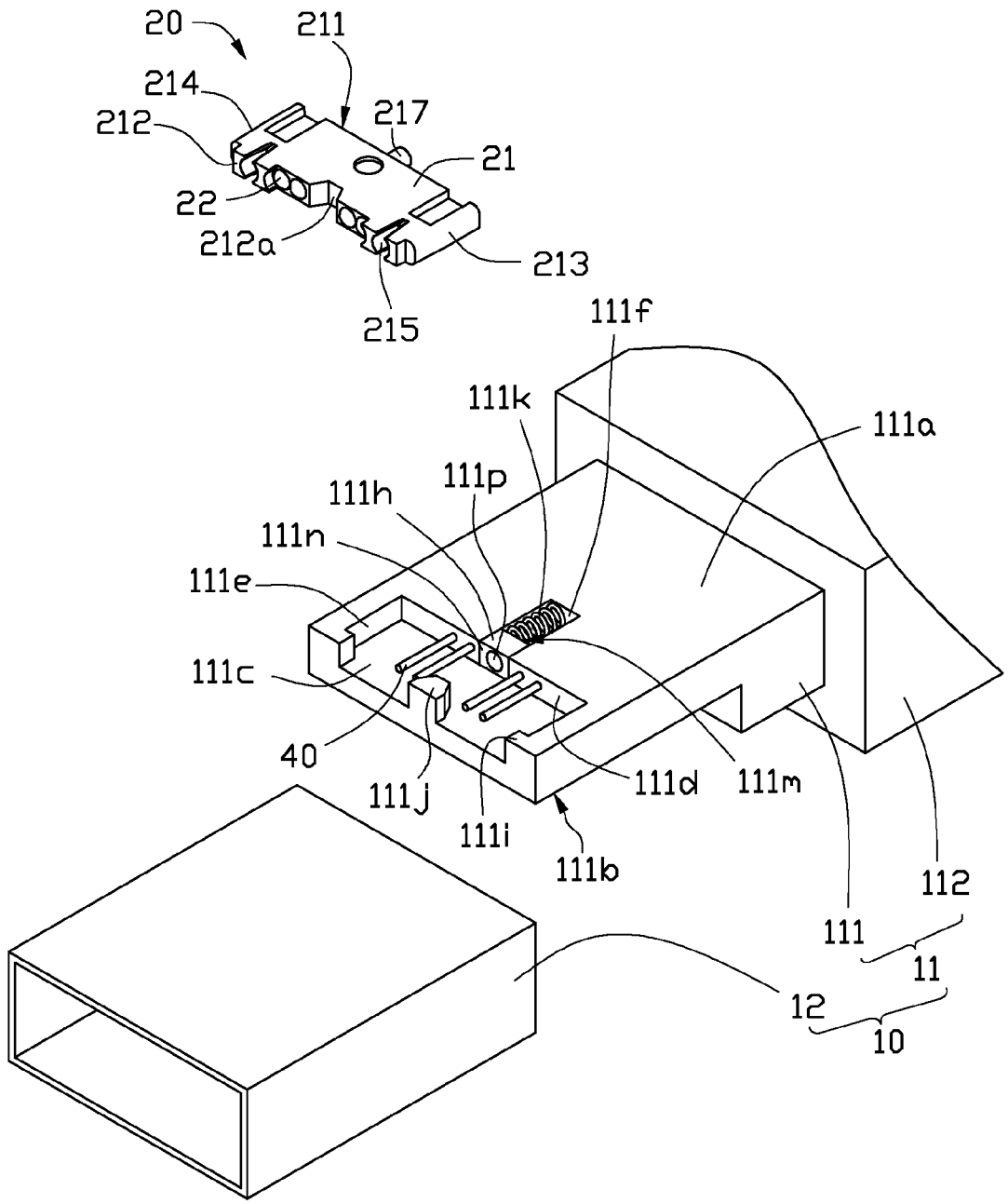
FIG. 2 is an exploded view of the optical fiber connector of FIG. 1.
Figure 3:
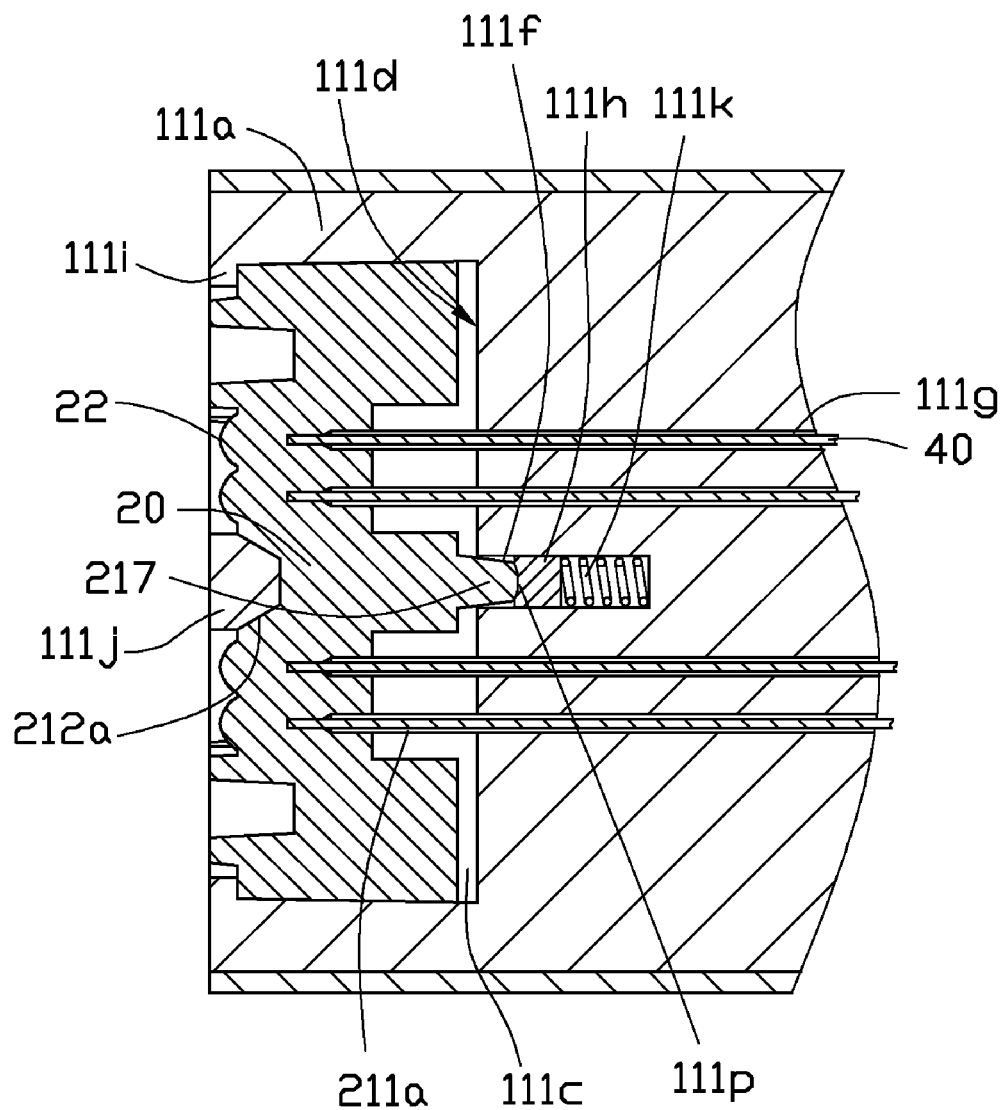
FIG. 3 is a sectional view of the optical fiber connector of FIG. 1, taken along line III-III.

Referring to FIGS. 1-3, an optical fiber connector 100, according to an exemplary embodiment, is shown. The optical fiber connector 100 includes a connector hold 10 and an optical fiber connector body 20.

The connector hold 10 includes a positioning member 11 and a sleeve member 12. The positioning member 11 includes an insert 111 and a handle 112 integrally formed with the insert 111. The insert 111 includes an upper surface 111a and an opposite lower surface 111b. The insert 111 defines a receiving recess 111c in the upper 10 surface 111a thereof. The receiving recess 111c extends exposed at a distal end surface of the insert 111. The receiving recess 111c includes a first side surface 111d and two opposite second side surfaces 111e. The first side surface 111d defines a position slot 111f in communication with the receiving recess 111c and a number of through holes 111g exposed in the receiving recess 111c for allowing optical fibers 40 to pass therethrough. In this embodiment, the number of the through holes 111g is four. In this embodiment, the position slot 111f is substantially rectangular in cross section. The insert 111 includes a slide block 111h and an elastic member 111k received in the position slot 111f. The slide block 111h includes a first end surface 111m and an opposite second end surface 111n. The size and shape of the slide block 111h in cross section correspond to those of the position slot 111f in cross section. The slide block 111h includes a concave portion 111p defined in the second end surface 111n thereof. In this embodiment, the elastic member 111k is a helical spring. The insert 111 further includes two first resisting blocks 111i and a second resisting block 111j. The two first resisting blocks 111i extend from the second side surface toward each other, and the second resisting block 111j is formed between the two first resisting blocks 111i.

The sleeve member 12 is substantially rectangular and hollow, receiving the insert 111 of the positioning member 11 therein.

The optical fiber connector body 20 includes a main portion 21 and a number of lenses 22 optically coupling to the respective optical fibers 40. The main portion 21 includes a first surface 211, a second surface 212, a third surface 213 and a fourth surface 214. The first surface 211 and the second surface 212 are on opposite sides of the main portion 21 and are substantially parallel. The third surface 213 and the fourth surface 214 are on opposite sides of the main portion 21 and are substantially parallel. The first surface 211 and the second surface 212 are substantially perpendicular to the third surface 213 and the fourth surface 214. The first surface 211 defines a number of blind holes 211a spatially corresponding to the through holes 111 therein, each aligned with a corresponding through hole 111. Each of the blind holes 211a receives and fixes an end of an optical fiber 40 therein. The second surface 212 defines two engagement portions 215. The engagement portions 215 receive a matched optical fiber connector (not shown). The main portion 21 includes a positioning post 217 formed on the first surface 211 thereof, a distal end surface of the positioning post 217 is narrower than the slide block 111 and matches the concave portion 111p of the slide block 111. Alternatively, the slide block 111h can be integrally formed on the positioning post 217. The second surface 212 includes a cutout portion 212a corresponding to the second resisting block 111j. The lenses 22 are positioned in the second surface 212 of the main body 21 and each aligns with a corresponding blind hole 211a. In this embodiment, the lenses 22 are integrally formed with the main portion 21.

In assembly, the optical fiber connector body 21 is engaged in the receiving recess 111c. The elastic member 111k and the slide block 111h are received in the 15 position slot 111f; one end of the elastic member 111k contacts the bottom surface of the position slot 111f, and the other end of the elastic member 111k contacts the first end surface 111m of the slide block 111h. The positioning post 217 inserts in the position slot 111f, and a distal end surface of the positioning post 217 is matingly engaged in the concave portion 111p of the slide block 111h. The second surface 212 near both of the third surface 213 and the fourth surface 214 resists on the first resisting blocks 111i. The cutout portion 223 of the second surface 212 abutting against the second resisting block 111j. The optical fibers 40 pass through the corresponding through holes 111g and are received and fixed in the corresponding blind holes 211a. Each optical fiber 40 is aligned with a corresponding lens 22.

The optical fiber connector 100 employs a slide block 111k in the position slot 111f restricting the distal end of the positioning post 217 of the optical fiber connector body 20, whereby misalignment of the optical fiber connector body 20 relative to the connector hold 10 caused by an outside force can be avoided, thus the coupling precision of the optical fiber connector 100 is ensured. In addition, the elastic member 30 can provide an elastic force on the optical fiber connector body 20, thus protecting the optical fiber connector body 20 from damage from external force.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical fiber connector, comprising:
   a connector hold defining a receiving recess, and a position slot in communication with the receiving recess;
   an elastic member received in the position slot; and
   an optical fiber connector body engaged in the recess, the optical fiber connector body comprising a positioning post inserted in the position slot, the optical fiber connector body including a plurality of optical fibers passing through the connector hold;
   wherein the connector hold comprises a slide block slidably received in the positioning slot, one end of the slide block contacts the elastic member, the other end of the slide block is engaged with a distal end of the positioning post, and the slide block is sized and shaped conforming to the position slot.

2. The optical fiber connector of claim 1, wherein the slide block is non-rotatably engaged in the position slot.

3. The optical fiber connector of claim 1, wherein the slide block includes a concave portion, the distal end of the positioning post is matingly engaged in the concave portion.

4. The optical fiber connector of claim 1, wherein the distal end of the positioning post is narrower than the slide block.

5. The optical fiber connector of claim 1, wherein the connector hold comprises a positioning member and a sleeve member, the positioning member received in the sleeve member.

6. The optical fiber connector of claim 5, wherein the positioning member comprises an insert and a handle integrally formed with the insert, the insert is received in the sleeve member, the optical fiber connector body is mounted on the insert in the sleeve.

7. The optical fiber connector of claim 6, wherein the insert comprises an upper surface and a lower surface, the receiving recess is defined in the upper surface, the receiving recess exposed at a distal end face of the insert.

8. The optical fiber connector of claim 7, wherein the connector hold includes a plurality of through holes exposed in the receiving recess for allowing the optical fibers to pass therethrough.

9. The optical fiber connector of claim 6, wherein the insert comprises two first resisting blocks and a second resisting block located between the first resisting blocks, and the optical fiber connector body is urged against the first resisting blocks and the second resisting block by the elastic member.

10. The optical fiber connector of claim 1, wherein the optical fiber connector body comprises a main portion and a number of lenses formed on the main portion.

11. The optical fiber connector of claim 10, wherein the main portion comprises a first surface, a second surface, a third surface and a fourth surface, the first surface and the second surface are on opposite sides of the main portion and are substantially parallel, the third surface and the fourth surface are on opposite sides of the main portion and are substantially parallel.

12. The optical fiber connector of claim 11, wherein the first surface defines a plurality of blind holes spatially corresponding to the through holes therein, the optical fibers inserted in the corresponding blind holes, the lenses are aligned with the corresponding optical fibers.

13. The optical fiber connector of claim 11, wherein the main portion comprises a cutout portion corresponding to the second resisting block, the cutout portion abutting against the second resisting block.

14. The optical fiber connector of claim 1, wherein the elastic member is a helical spring.

\* \* \* \* \*